US012676422B2

(12) United States Patent
Cheung

(10) Patent No.: US 12,676,422 B2
(45) Date of Patent: Jul. 7, 2026

(54) ANTENNA ASSEMBLY WITH ADJUSTABLE GAIN LENS

(71) Applicant: The Boeing Company, Arlington, VA (US)

(72) Inventor: James Cheung, Los Angeles, CA (US)

(73) Assignee: The Boeing Company, Arlington, VA (US)

( * ) Notice: Subject to any disclaimer, the term of this patent is extended or adjusted under 35 U.S.C. 154(b) by 79 days.

(21) Appl. No.: 18/362,464

(22) Filed: Jul. 31, 2023

(65) Prior Publication Data

US 2025/0047008 A1 Feb. 6, 2025

(51) Int. Cl.
*H01Q 19/06* (2006.01)
*H01Q 3/12* (2006.01)

(52) U.S. Cl.
CPC ............. *H01Q 19/062* (2013.01); *H01Q 3/12* (2013.01)

(58) Field of Classification Search
CPC .......... H01Q 19/062; H01Q 3/12; H01Q 3/08; H01Q 15/08; H01Q 3/14; H01Q 15/02; H01Q 3/02; H01Q 13/02; H04B 1/03
USPC .......................................................... 343/909
See application file for complete search history.

(56) References Cited

U.S. PATENT DOCUMENTS

| | | | | |
|---|---|---|---|---|
| 2,608,656 A * | 8/1952 | Korman | H01Q 19/062 343/756 |
| 3,656,165 A * | 4/1972 | Walter | H01Q 19/062 343/756 |
| 6,556,174 B1 * | 4/2003 | Hamman | H01Q 19/10 343/912 |
| 7,446,723 B2 * | 11/2008 | Osaka | H01Q 3/02 343/901 |
| 9,583,840 B1 * | 2/2017 | Lawrance | H01Q 15/04 |
| 2008/0180336 A1 * | 7/2008 | Bauregger | H01Q 9/0407 343/753 |
| 2009/0051613 A1 * | 2/2009 | Koch | H01Q 19/062 343/753 |
| 2012/0119932 A1 * | 5/2012 | MacDonald | H01Q 1/425 342/1 |
| 2021/0111496 A1 * | 4/2021 | Matitsine | H01Q 25/007 |
| 2021/0384638 A1 | 12/2021 | Chan et al. | |

(Continued)

FOREIGN PATENT DOCUMENTS

| | | | | |
|---|---|---|---|---|
| DE | 20207092 U1 * | 9/2003 | H01Q 1/3233 |
| EP | 3691026 A1 * | 8/2020 | G01F 23/284 |

OTHER PUBLICATIONS

Extended European Search Report for European Application No. EP241919224 dated Dec. 12, 2024, 13 pages.

*Primary Examiner* — Dimary S Lopez Cruz
*Assistant Examiner* — Brandon Sean Woods
(74) *Attorney, Agent, or Firm* — Harrity & Harrity, LLP

(57) ABSTRACT

An adjustable gain antenna including an RF emitter configured to emit an RF signal along an emitter axis. A first refractive lens having an optical axis collinear with the emitter axis and a second refractive lens having an optical axis collinear with the emitter axis with the first refractive lens located between the RF emitter and the second refractive lens. A drive mechanism mechanically linked to the first refractive lens and the second refractive lens, wherein the drive mechanism is configured to move the first refractive lens and the second refractive lens longitudinally along the emitter axis to vary a gain of the RF emitter.

20 Claims, 2 Drawing Sheets

(56) References Cited

U.S. PATENT DOCUMENTS

| | | | | |
|---|---|---|---|---|
| 2022/0158354 | A1* | 5/2022 | Bamford | H01Q 19/062 |
| 2023/0114625 | A1* | 4/2023 | Lier | H01Q 21/067<br>343/700 R |

* cited by examiner

ANTENNA ASSEMBLY WITH ADJUSTABLE GAIN LENS

FIELD

The present disclosure relates to the field of antennas and in particular radio frequency (RF) antennas having adjustable gain.

BACKGROUND

Antennas generally include an emitter with at least one focusing element that directs electromagnetic radiation towards the direction of interest. The size, shape, and longitudinal position of the focusing element along the emitter axis contributes to a gain that the antenna can produce. Generally, the antenna could have a low gain and provide a wide field of view, or the antenna could have a high gain and provide a narrow field of view. This field of view is a parameter of interest in both remote sensing and communications applications. While low-gain antennas produce a wider field of view than high-gain antennas, they typically radiate less energy at the direction of interest.

SUMMARY

[The summary will be completed when the claims are finalized. The summary will simply restate and follow the claims.]

An adjustable gain antenna is disclosed herein. The antenna includes an RF emitter configured to emit an RF signal along an emitter axis. A first refractive lens having an optical axis collinear with the emitter axis and a second refractive lens having an optical axis collinear with the emitter axis with the first refractive lens located between the RF emitter and the second refractive lens. A drive mechanism mechanically linked to the first refractive lens and the second refractive lens, wherein the drive mechanism is configured to move the first refractive lens and the second refractive lens longitudinally along the emitter axis to vary a gain of the RF emitter.

In one or more embodiments of the antenna, the first refractive lens and the second refractive lens are comprised of at least one of PLA (polylactic acid) or ABS (acrylonitrile butadiene styrene).

In one or more embodiments of the antenna, the first refractive lens and the second refractive lens are each coated in an RF-transparent material.

In one or more embodiments of the antenna, the RF-transparent material includes Aptek 2515AB.

In one or more embodiments of the antenna, the RF emitter is a single aperture RF emitter.

In one or more embodiments of the antenna, the RF emitter is configured to generate a circular polarization.

In one or more embodiments of the antenna, the RF emitter is configured to generate a linear polarization.

In one or more embodiments of the antenna, the RF emitter is configured to generate an elliptical polarization.

In one or more embodiments of the antenna, the first refractive lens and the second refractive lens are injection molded.

In one or more embodiments of the antenna, the first refractive lens and the second refractive lens are 3D printed.

In one or more embodiments of the antenna, the RF emitter is circular horn antenna.

In one or more embodiments of the antenna, the RF signal includes a frequency range of 26.5-40 gigahertz (GHz).

In one or more embodiments of the antenna, the antenna includes at least one additional refractive lens positioned along the emitter axis with the drive mechanism configured to adjust the at least one additional refractive lens.

In one or more embodiments of the antenna, the antenna includes a mounting assembly for selecting a field of view of the antenna.

A method of operating an antenna assembly is disclosed herein, the method includes determining a gain for the antenna assembly and positioning at least one of a first refractive lens or a second refractive lens each in a first longitudinal position along an emitter axis of an RF emitter. An RF beam is emitted along the emitter axis with the RF emitter.

In one or more embodiments of the method, the method includes positioning both the first refractive lens and the second refractive lens along the emitter axis.

In one or more embodiments of the method, the method includes rotating the antenna assembly about a point to vary a field of view of the antenna assembly in the azimuth and elevation angles.

In one or more embodiments of the method, the RF emitter is a single aperture RF emitter.

In one or more embodiments of the method, the method includes positioning the first refractive lens and the second refractive lens each in a second longitudinal position along the emitter axis to generate a second gain.

An antenna assembly is disclosed herein. The antenna assembly includes an RF emitter configured to emit an RF signal along an emitter axis. A first refractive lens having an optical axis collinear with the emitter axis and a second refractive lens having an optical axis collinear with the emitter axis with the first refractive lens located between the RF emitter and the second refractive lens. A drive mechanism mechanically linked to the first refractive lens and the second refractive lens, with the drive mechanism configured to move the first refractive lens and the second refractive lens longitudinally along the emitter axis to vary a gain of the RF emitter. A mounting assembly for selecting a field of view of an adjustable gain antenna. A controller configured to determine a gain for the antenna assembly and position at least one of a first refractive lens or a second refractive lens each in a first longitudinal position along an emitter axis of an RF emitter. The controller is also configured to direct an RF beam along the emitter axis with the RF emitter.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The Figures and the following description illustrate specific exemplary embodiments of the disclosure. A person of ordinary skill in the art will be able to devise various arrangements that, although not explicitly described or shown herein, embody the principles of the disclosure and are included within the scope of the disclosure. Furthermore, any examples described herein are intended to aid in understanding the principles of the disclosure and are to be construed as being without limitation to such specifically recited examples and conditions. As a result, the disclosure is not limited to the specific embodiments or examples described below but by the claims and their equivalents.

Figure 1:
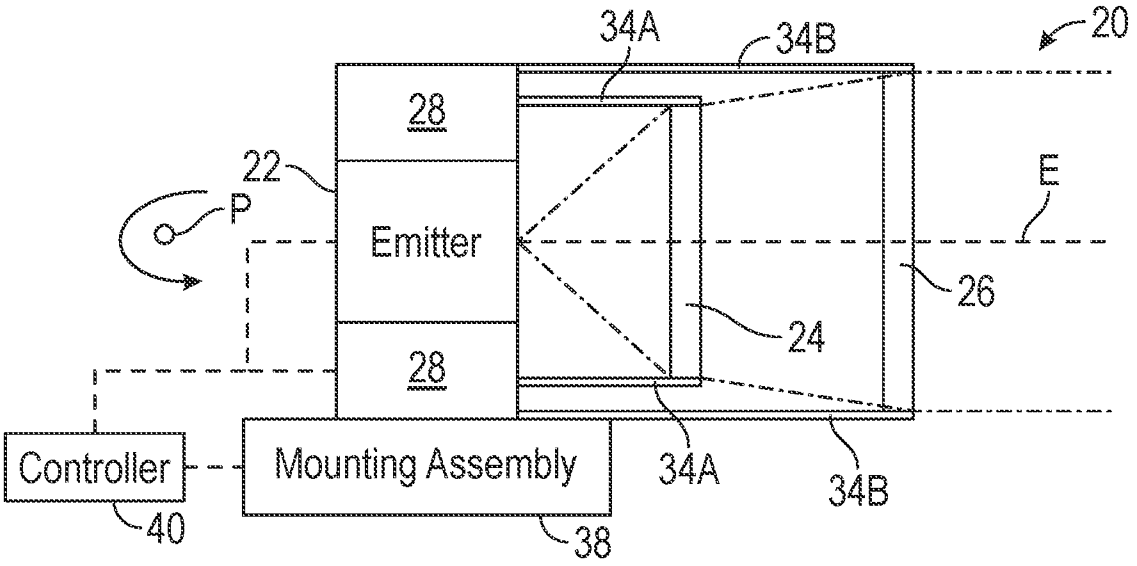
FIG. 1 illustrates an example antenna assembly in a first position having a first gain.
Figure 2:
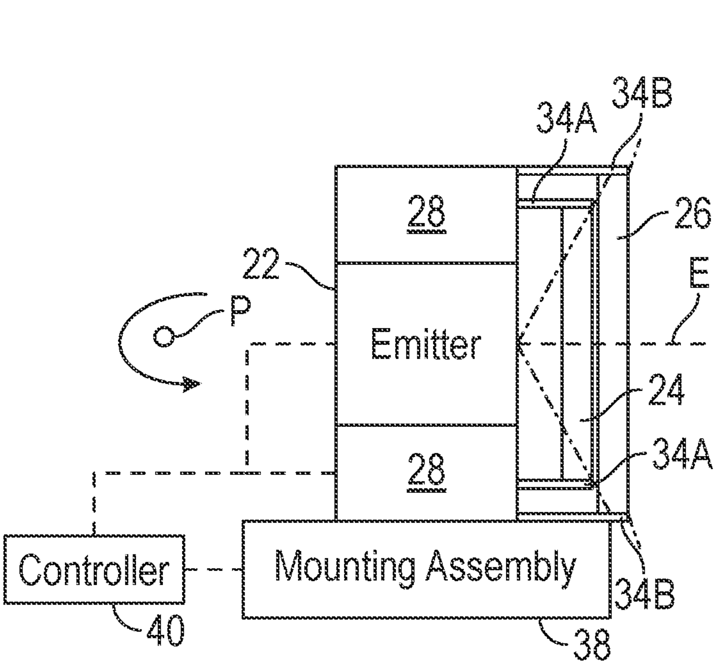
FIG. 2 illustrates the antenna assembly of FIG. 1 in a second position having a second gain.

FIG. 1 illustrates an adjustable gain antenna assembly 20. The antenna assembly 20 includes an RF emitter 22, a first refractive lens 24, a second refractive lens 26, and a drive mechanism 28 for positioning the first and second refractive lens 24, 26 relative to the RF emitter 22. In the illustrated example, the RF emitter 22 is a single aperture RF emitter such that it emits RF beams at a range of frequencies limited to a single band but at multiple frequencies, e.g., GPS patch antennas. In one example, the RF emitter 22 is a circular horn antenna and is configured to emit an RF signal having a frequency range of between 26.5-40 gigahertz (GHz) along the Ka band. The RF emitter 22 is also configured to emit the RF beams along an emitter axis E that extends through the first and second refractive lens 24, 26. The RF emitter 22 can also generate RF beams with one of a circular polarization, such as left or right-handed circular polarization, a linear polarization, or an elliptical polarization.

The first and second refractive lens 24, 26 are positioned along the emitter axis E with the first refractive lens 24 located intermediate or between the RF emitter 22 and the second refractive lens 26. In one example, the first and second refractive lens 24, 26 are comprised of at least one of a polylactic acid (PLA) material or an acrylonitrile butadiene styrene (ABS) material. The first and second refractive lens 24, 26 are each coated in an RF-transparent material, such as Aptek 2515AB, that can protect antenna material from environmental conditions while still allowing for the transmission of RF beams. The first and second refractive lens 24, 26 can be made in an injection molding process or from a three-dimensional (3D) printing process.

In one example, the first refractive lens 24 includes a first face that faces the RF emitter 22 for accepting the RF signal and a second face located opposite the first face. Similarly, the second refractive lens 26 includes a first face that faces the first refractive lens 24 and the RF emitter 22 and a second face located opposite the first face.

A drive mechanism 28 mechanically links the first refractive lens 24 and the second refractive lens 26 for movement relative to the RF emitter 22 to vary a focal length and therefore a gain of the antenna assembly 20. In the illustrated example, the drive mechanism 28 utilizes a first set of linear actuators 34A moveable by at least one drive motor to position the first refractive lens 24 and a second set of linear actuators 34B to position the second refractive lens 26 longitudinally along the emitter axis E to vary the gain of the RF emitter 22. In one example, the linear actuators are telescopic, and, in another example, the linear actuators included threaded shafts that are rotatably driven.

A controller 40 communicates with the drive mechanism 28 to control the operation of the drive mechanism 28. Any of the various control elements (e.g., electrical, or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-transitory computer readable medium, non-volatile storage, logic, or some other physical hardware component or module.

The antenna assembly 20 attached to a mounting assembly 38 to rotate the antenna assembly 20 about a point P to vary and azimuth angle and an elevation angle of the RF beams traveling through the first and second refractive lens 24, 26. Movement of the antenna assembly 20 about the mounting assembly 38 can be managed by the controller 40, which is in electrical communication with the mounting assembly 38. This allows for aiming the antenna assembly 20 in a given direction or for movement of the antenna assembly to one of a plurality of different rotational positions depending on the application. This can be helpful when using the antenna assembly 20 in an adaptive radar configuration. In particular, the antenna assembly 20 can operate at low gain for performing a broad target search and can then adjust to a high gain for more precise tracking of an object. A feature of the adjustability of the gain of the antenna assembly 20 is the ability to perform multiple functions with a single antenna assembly 20.

The antenna assembly 20 can also be used for synthetic aperture radar (SAR) imagery to detect physical properties of an object. The antenna assembly 20 can be used with a low gain to obtain imagery over a wide area and can then adjust to a high gain to create a zoomed image that focuses on a smaller area.

Furthermore, the antenna assembly 20 can be used for crosslink communications. For crosslink communications, the antenna assembly 20 can be in a low gain configuration for radar pose detection and then transition to a high gain for high-speed communications.

Figure 3:
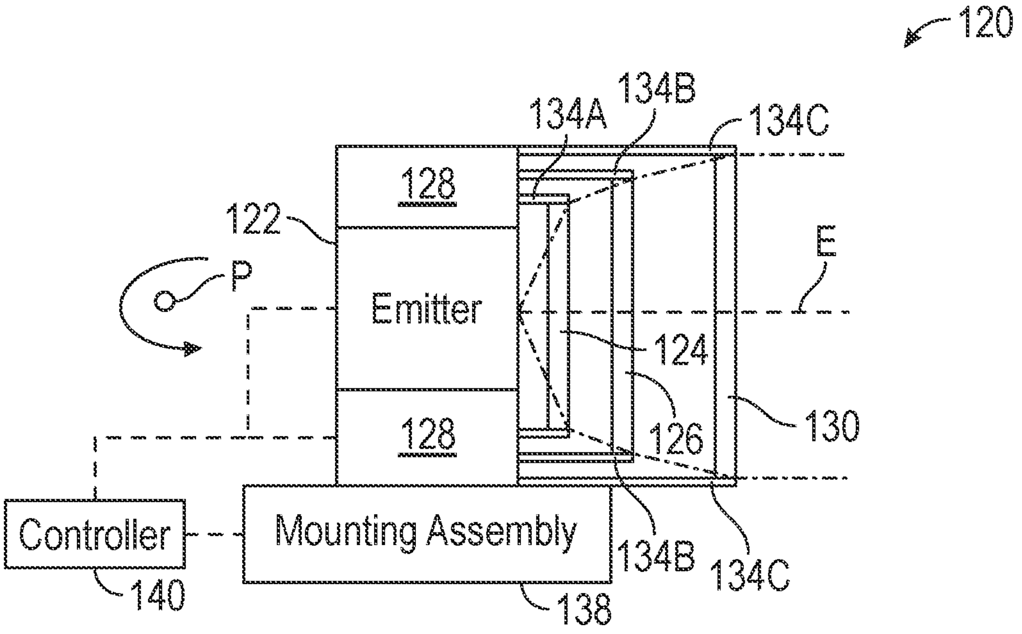
FIG. 3 illustrates another example antenna assembly.

FIG. 3 illustrates another example antenna assembly 120. The antenna assembly 120 is similar to the antenna assembly 20 except where noted below or shown in the FIGS. Similar items between the antenna assembly 20 and the antenna assembly 120 will include like numbers with the addition of a leading "1". The assembly 120 includes an RF emitter 122, a first refractive lens 124, a second refractive lens 126, a third refractive lens 130, and a drive mechanism 128. The drive mechanism 128 positions the first, second, and third refractive lens 124, 126, 130 relative to the RF emitter 122 along an emitter axis E to vary the gain of the antenna assembly 120 with first, second, and third sets of linear actuators 134A, 134B, 134C, respectively. The addition of the third refractive lens 130 in the assembly 120 allows for greater variation in gain, such as when there are size packaging constraints for the antenna assembly 120.

Figure 4:
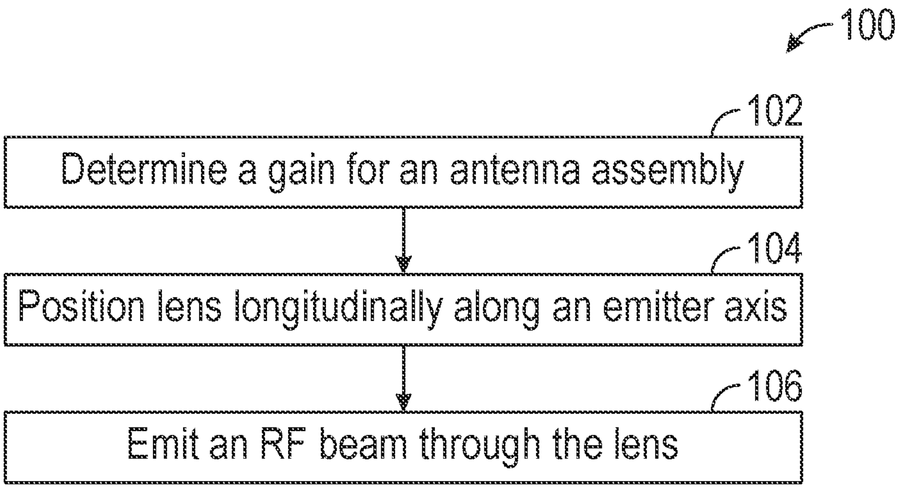
FIG. 4 illustrates an example method of operating the antenna assembly of FIG. 1.

FIG. 4 illustrates an example method 100 of operating either of the antenna assembly 20 or 120. The method 100 includes determining a gain for the antenna assembly 20, 120 (Block 102). The gain for the antenna assemblies 20, 120 will depend on the application, such as the applications described above, and whether the application is better suited for high, low, or another variation in gain for the antenna assembly.

Once the gain has been determined, the method 100 positions the lens 24, 26, 124, 126, 130 longitudinally along the emitter axis E for the emitter 22, 122 (Block 104). The position of each of the lens 24, 26, 124, 126, 130 will determine the gain the antenna assembly 20, 120 produces. The longitudinal positions for all of the lens 24, 26, 124, 126, 130 can be predetermined by the controller 40, 140 or selected depending on the given application.

With the refractive lens 24, 26, 124, 126, 130 positioned longitudinally along the emitter axis E, the emitter 22, 122 can then emit an RF beam that travels through the lens 24, 26, 124, 126, 130 (Block 106). A position of the antenna assemblies 20, 120 can also be varied about the point P with the mounting assembly 38, 138 to control aiming a field of view of the RF beam for a given application.

The following Clauses provide example configurations of antenna assemblies and methods for operating the antenna assemblies of FIGS. 1-4.

Clause 1: An adjustable gain antenna comprising: an RF emitter configured to emit an RF signal along an emitter axis; a first refractive lens having an optical axis collinear with the emitter axis; a second refractive lens having an optical axis collinear with the emitter axis with the first refractive lens located between the RF emitter and the second refractive lens; and a drive mechanism mechanically linked to the first refractive lens and the second refractive lens, wherein the drive mechanism is configured to move the first refractive lens and the second refractive lens longitudinally along the emitter axis to vary a gain of the RF emitter.

Clause 2: The antenna of claim 1, wherein the first refractive lens and the second refractive lens are comprised of at least one of PLA (polylactic acid) or ABS (acrylonitrile butadiene styrene).

Clause 3: The antenna of any of clauses 1-2, wherein the first refractive lens and the second refractive lens are each coated in an RF-transparent material.

Clause 4: The antenna of any of clauses 1-3, wherein the RF-transparent material includes Aptek 2515AB.

Clause 5: The antenna of any of clauses 1-4, wherein the RF emitter is a single aperture RF emitter.

Clause 6: The antenna of any of clauses 1-5, wherein the RF emitter is configured to generate a circular polarization.

Clause 7: The antenna of any of clauses 1-6, wherein the RF emitter is configured to generate a linear polarization.

Clause 8: The antenna of any of clauses 1-7, wherein the RF emitter is configured to generate an elliptical polarization.

Clause 9: The antenna of any of clauses 1-8, wherein the first refractive lens and the second refractive lens are injection molded.

Clause 10: The antenna of any of clauses 1-9, wherein the first refractive lens and the second refractive lens are 3D printed.

Clause 11: The antenna of any of clauses 1-10, wherein the RF emitter is circular horn antenna.

Clause 12: The antenna of any of clauses 1-11, wherein the RF signal includes a frequency range of 26.5-40 gigahertz (GHz).

Clause 13: The antenna of any of clauses 1-12, including at least one additional refractive lens positioned along the emitter axis with the drive mechanism configured to adjust the at least one additional refractive lens.

Clause 14: The antenna of any of clauses 1-13, including a mounting assembly for selecting a field of view of the antenna.

Clause 15: A method of operating an antenna assembly, the method comprising: determining a gain for the antenna assembly; positioning at least one of a first refractive lens or a second refractive lens each in a first longitudinal position along an emitter axis of an RF emitter; and emitting an RF beam along the emitter axis with the RF emitter.

Clause 16. The method of clause 15, including positioning both the first refractive lens and the second refractive lens along the emitter axis.

Clause 17. The method of any of clauses 15-16, including rotating the antenna assembly about a point to vary a field of view of the antenna assembly in the azimuth and elevation angles.

Clause 18. The method of any of clauses 15-17, wherein the RF emitter is a single aperture RF emitter.

Clause 19. The method of any of clauses 15-18, including positioning the first refractive lens and the second refractive lens each in a second longitudinal position along the emitter axis to generate a second gain.

Clause 20. An antenna assembly comprising: an RF emitter configured to emit an RF signal along an emitter axis; a first refractive lens having an optical axis collinear with the emitter axis; a second refractive lens having an optical axis collinear with the emitter axis with the first refractive lens located between the RF emitter and the second refractive lens; and a drive mechanism mechanically linked to the first refractive lens and the second refractive lens, wherein the drive mechanism is configured to move the first refractive lens and the second refractive lens longitudinally along the emitter axis to vary a gain of the RF emitter; a mounting assembly for selecting a field of view of an adjustable gain antenna; and a controller configured to: determine a gain for the antenna assembly; position at least one of a first refractive lens or a second refractive lens each in a first longitudinal position along an emitter axis of an RF emitter; and direct an RF beam along the emitter axis with the RF emitter.

While various embodiments have been described, the description is intended to be exemplary rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. An antenna assembly with adjustable gain, comprising:

a radio frequency (RF) emitter configured to emit an RF beam along an emitter axis;

a first refractive lens having an optical axis collinear with the emitter axis;

a second refractive lens having an optical axis collinear with the emitter axis, wherein the first refractive lens is located between the RF emitter and the second refractive lens;

a third refractive lens having an optical axis collinear with the emitter axis, wherein the first refractive lens and the second refractive lens are located between the RF emitter and the third refractive lens;

a drive mechanism, comprising:

- a first set of linear actuators mechanically linked to the first refractive lens,
- a second set of linear actuators mechanically linked to the second refractive lens, and
- a third set of linear actuators mechanically linked to the third refractive lens, wherein the drive mechanism is configured to independently position the first refractive lens, the second refractive lens, and the third refractive lens relative to the RF emitter longitudinally along the emitter axis to vary a gain of the RF emitter based on varying a focal length of the antenna assembly; and a controller in electrical communication with the drive mechanism and configured to change one or more of a first position of the first refractive lens, a second position of the second refractive lens, or a third position of the third refractive lens to adjust the antenna assembly from a low gain configuration to a high gain configuration.

2. The antenna assembly of claim 1, wherein the first refractive lens, the second refractive lens, and the third refractive lens are comprised of at least one of PLA (polylactic acid) or ABS (acrylonitrile butadiene styrene).

3. The antenna assembly of claim 1, wherein the first refractive lens, the second refractive lens, and the third refractive lens are each coated in an RF-transparent material.

4. The antenna assembly of claim 3, wherein the RF-transparent material protects the first refractive lens, the second refractive lens, and the third refractive lens from environmental conditions while allowing for transmission of the RF beam.

5. The antenna assembly of claim 1, wherein the RF emitter is a single aperture RF emitter.

6. The antenna assembly of claim 5, wherein the RF emitter is configured to generate one or more of:

a circular polarization, a linear polarization, or an elliptical polarization.

7. The antenna assembly of claim 1, wherein the first refractive lens, the second refractive lens, and the third refractive lens are injection molded.

8. The antenna assembly of claim 1, wherein the first refractive lens, the second refractive lens, and the third refractive lens are 3D printed.

9. The antenna assembly of claim 1, wherein the RF emitter is a circular horn antenna.

10. The antenna assembly of claim 1, wherein the RF beam includes a frequency range of 26.5-40 gigahertz (GHz).

11. The antenna assembly of claim 1, including a mounting assembly for selecting a field of view of the RF beam.

12. The antenna assembly of claim 1, wherein:

the low gain configuration is associated with a broad target search and the high gain configuration is associated with precise tracking of an object in an adaptive radar configuration, the low gain configuration is associated with obtaining imagery over a first area and the high gain configuration is associated with creating a zoomed image of a second area smaller than the first area in a synthetic aperture radar imagery configuration, or the low gain configuration is associated with radar pose detection and the high gain configuration is associated with high-speed communications in a crosslink communications configuration.

13. A method of operating an antenna assembly, the method comprising:

determining a first gain for the antenna assembly, wherein the antenna assembly comprises:

a first refractive lens, a second refractive lens, a third refractive lens, a first set of linear actuators mechanically linked to the first refractive lens, a second set of linear actuators mechanically linked to the second refractive lens, and a third set of linear actuators mechanically linked to the third refractive lens;

positioning the first refractive lens, independently of the second refractive lens and the third refractive lens, in a first longitudinal position along an emitter axis of a radio frequency (RF) emitter to generate the determined first gain in a low gain configuration based on a first focal length of the antenna assembly;

emitting, by the RF emitter, a first RF beam along the emitter axis;

determining a second gain for the antenna assembly;

positioning the first refractive lens, independently of the second refractive lens and the third refractive lens, in a second longitudinal position along the emitter axis of the RF emitter to generate the determined second gain in a high gain configuration based on a second focal length of the antenna assembly; and emitting, by the RF emitter, a second RF beam along the emitter axis.

14. The method of claim 13, further comprising:

positioning the second refractive lens and the third refractive lens along the emitter axis to generate the determined first gain.

15. The method of claim 14, further comprising rotating the antenna assembly about a point to vary a field of view of the RF beam in an azimuth angle and an elevation angle.

16. The method of claim 14, wherein the RF emitter is a single aperture RF emitter.

17. The method of claim 13, wherein:

the low gain configuration is associated with a broad target search and the high gain configuration is associated with precise tracking of an object in an adaptive radar configuration, the low gain configuration is associated with obtaining imagery over a first area and the high gain configuration is associated with creating a zoomed image of a second area smaller than the first area in a synthetic aperture radar imagery configuration, or the low gain configuration is associated with radar pose detection and the high gain configuration is associated with high-speed communications in a crosslink communications configuration.

18. An antenna assembly comprising:

a radio frequency (RF) emitter configured to emit an RF beam along an emitter axis;

a first refractive lens having an optical axis collinear with the emitter axis;

a second refractive lens having an optical axis collinear with the emitter axis, wherein the first refractive lens is located between the RF emitter and the second refractive lens;

a third refractive lens having an optical axis collinear with the emitter axis, wherein the first refractive lens and the second refractive lens are located between the RF emitter and the third refractive lens;

a drive mechanism, comprising:

a first set of linear actuators mechanically linked to the first refractive lens, a second set of linear actuators mechanically linked to the second refractive lens, and a third set of linear actuators mechanically linked to the third refractive lens, wherein the drive mechanism is configured to independently position the first refractive lens, the second refractive lens, and the third refractive lens relative to the RF emitter longitudinally along the emitter axis to vary a gain of the RF emitter based on varying a focal length of the antenna assembly;

a mounting assembly for selecting a field of view of the RF beam; and a controller configured to:

determine a first gain for the antenna assembly;

position the first refractive lens, independently of the second refractive lens and the third refractive lens, in a first longitudinal position along the emitter axis of the RF emitter to generate the determined first gain in a low gain configuration based on a first focal length of the antenna assembly;

direct a first RF beam along the emitter axis with the RF emitter;

determine a second gain for the antenna assembly;

position the first refractive lens, independently of the second refractive lens and the third refractive lens, in a second longitudinal position along the emitter axis of the RF emitter to generate the determined second gain in a high gain configuration based on a second focal length of the antenna assembly; and direct a second RF beam along the emitter axis.

19. The antenna assembly of claim 18, wherein the RF emitter is a single aperture RF emitter.

20. The antenna assembly of claim 18, wherein:

the low gain configuration is associated with a broad target search and the high gain configuration is associated with precise tracking of an object in an adaptive radar configuration, the low gain configuration is associated with obtaining imagery over a first area and the high gain configuration is associated with creating a zoomed image of a second area smaller than the first area in a synthetic aperture radar imagery configuration, or the low gain configuration is associated with radar pose detection and the high gain configuration is associated with high-speed communications in a crosslink communications configuration.

* * * * *